United States Patent
Yerram et al.

(10) Patent No.: US 11,512,640 B2
(45) Date of Patent: Nov. 29, 2022

(54) GAS TURBINE MODULE VENTILATION SYSTEM HAVING A CONTROLLABLE BAFFLE VANE

(71) Applicant: GENERAL ELECTRIC COMPANY, Schenectady, NY (US)

(72) Inventors: Ravinder Yerram, Sugar Land, TX (US); Randall John Kleen, Channelview, TX (US); Richard Michael Watkins, Spring, TX (US); Balakrishnan Ponnuraj, Sugar Land, TX (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 16/788,936

(22) Filed: Feb. 12, 2020

(65) Prior Publication Data
US 2021/0246830 A1    Aug. 12, 2021

(51) Int. Cl.
*F02C 7/18*    (2006.01)
*F02C 9/00*    (2006.01)

(52) U.S. Cl.
CPC .............. *F02C 7/18* (2013.01); *F02C 9/00* (2013.01); *F05D 2260/203* (2013.01)

(58) Field of Classification Search
CPC ........ F02C 7/18; F02C 9/00; F05D 2260/203; F05D 2260/608; F01D 25/14
USPC .......................................................... 417/17
See application file for complete search history.

(56) References Cited

U.S. PATENT DOCUMENTS

| | | | |
|---|---|---|---|
| 6,840,852 B2 | 1/2005 | Gehring et al. | |
| 8,529,202 B2* | 9/2013 | Zhang | F02C 7/20 415/177 |
| 10,215,070 B2 | 2/2019 | Kulkarni et al. | |
| 2013/0005237 A1* | 1/2013 | Baten | F24F 7/08 454/252 |
| 2014/0020394 A1* | 1/2014 | Laing | F02C 7/24 60/722 |
| 2014/0060082 A1 | 3/2014 | Lee et al. | |
| 2015/0056912 A1* | 2/2015 | Scipio | F24F 11/76 454/258 |
| 2016/0160683 A1* | 6/2016 | Papi | G06F 1/20 60/772 |
| 2016/0376967 A1* | 12/2016 | Kulkarni | F01D 25/26 60/39.5 |

FOREIGN PATENT DOCUMENTS

| | | |
|---|---|---|
| EP | 2893156 B1 | 7/2015 |
| EP | 3112617 A1 | 1/2017 |
| JP | 2000248906 A | 9/2000 |

OTHER PUBLICATIONS

EP Application No. 21154000.8; Extended EP Search Report dated Jun. 29, 2021; pp. 1-12.

* cited by examiner

*Primary Examiner* — J. Todd Newton
(74) *Attorney, Agent, or Firm* — Fletcher Yoder P.C.

(57) ABSTRACT

A turbine ventilation system includes a controller that is coupled to an actuator that is coupled to a vane that is disposed across an intake port between a gas turbine enclosure and the turbine ventilation system. The controller can cause the actuator to change a position of the vane to alter an air flow from the turbine ventilation system into the gas turbine enclosure based upon feedback from one or more sensors disposed within the gas turbine enclosure.

20 Claims, 6 Drawing Sheets

GAS TURBINE MODULE VENTILATION SYSTEM HAVING A CONTROLLABLE BAFFLE VANE

BACKGROUND

The subject matter disclosed herein relates to systems for ventilating a gas turbine enclosure.

Gas turbine generators are often used to produce electricity for a power grid. The gas turbine generators are typically stationary units disposed in a power plant, such as an integrated gasification combined cycle (IGCC) power plant. However, the gas turbine generators also may be used in mobile units, such as large trailers. The gas turbine generators typically include a gas turbine engine enclosed within an enclosure (e.g., gas turbine enclosure). In order to avoid a buildup of heat around the gas turbine engine, the gas turbine generators include ventilation systems to carry heat away from the gas turbine engine. Unfortunately, the designs of the ventilation systems may limit the use of the gas turbine generators to environments within certain ambient temperature ranges and increase the operating costs of the gas turbine generators. In addition, the ventilation systems may not properly cool equipment within the gas turbine enclosure under all conditions (e.g., air densities, temperatures, etc.). Further, the ventilation systems may draw a considerable amount of power, and thus reduce the efficiency of the gas turbine generators.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In accordance with a first embodiment, a system includes a gas turbine enclosure and a gas turbine engine disposed in the gas turbine enclosure. The gas turbine engine outputs an exhaust flow. The system also includes a ventilation system that is coupled to the gas turbine enclosure. The ventilation system includes a vane disposed across an intake port between the gas turbine enclosure and the ventilation system, an actuator coupled to the vane, and a controller coupled to the actuator. The controller can cause the actuator to change a position of the vane to alter an air flow from the ventilation system into the gas turbine enclosure.

In accordance with a second embodiment, a system includes a turbine ventilation system that is coupled to a gas turbine enclosure. The turbine ventilation system includes a vane disposed across an intake port between the gas turbine enclosure and the turbine ventilation system, an actuator that is coupled to the vane, and one or more sensors that are disposed within the gas turbine enclosure. The turbine ventilation system also includes a controller that is coupled to the actuator. The controller can cause the actuator to change a position of the vane to alter an air flow from the turbine ventilation system into the gas turbine enclosure based on feedback received from the one or more sensors.

In accordance with a third embodiment, a system includes a gas turbine controller having a memory that stores instructions and a processor, which is coupled to the memory and executes the instructions. Upon the execution of the instructions, the processor receives feedback from one or more sensors disposed within a gas turbine enclosure that has a gas turbine engine disposed in the gas turbine enclosure. The processor, executing the instructions, also causes an actuator that is coupled to a vane disposed across an intake port between the gas turbine enclosure and a ventilation system to change a position of the vane to alter an air flow from the ventilation system into the gas turbine enclosure.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements. Furthermore, the term "or" is intended to be inclusive indicating that A or B includes A alone, B alone, or both A and B.

The disclosed embodiments are directed to systems and methods for ventilating enclosures that surround gas turbine engines. Proper ventilation of equipment (e.g., gas turbine engine) removes undesired emissions within the enclosure, as well as providing cooling within the enclosure. In the disclosed embodiments, a ventilation system includes a controllable vane (e.g., baffle vane) disposed across an intake port between the ventilation system and a gas turbine enclosure that directs air flow from the ventilation system in the gas turbine enclosure. The controllable vane, being actuated by an actuator, for example, is movable to a range of positions to provide for an increased distribution of air flow to a desired location within the gas turbine enclosure. The vane may be automatically controlled by a controller. In certain embodiments, the controller may adjust the vane based on feedback (pressure, temperature, etc.) from sensors disposed within the gas turbine enclosure. The controllable vane also provides for cooling and mixing of air in the gas turbine module for a range of air densities and temperature conditions. Proper air distribution may provide optimum cooling performance (e.g., by minimizing hot spots within the enclosure) to enable the equipment within the enclosure to operate within their respective rated temperature limits. In particular, the disclosed embodiments may protect gas turbine engines by effectively facilitating air flow (e.g., cooling distribution) in a plurality of air densities and boundary conditions throughout a gas turbine enclosure.

Figure 1:
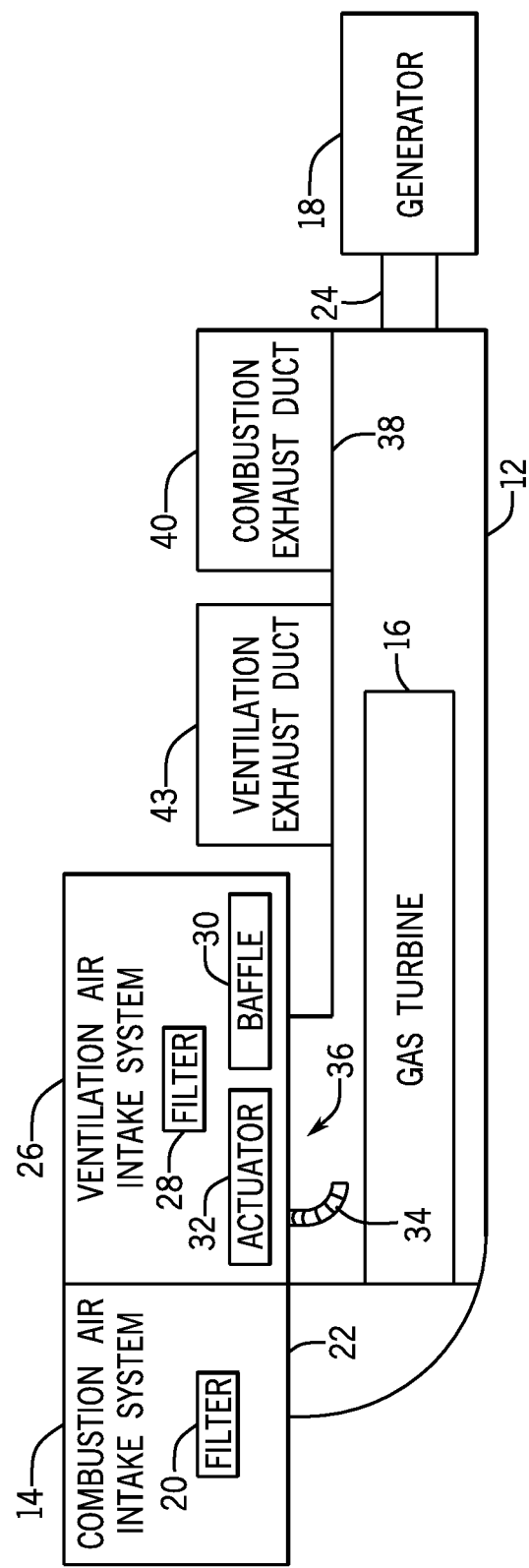
FIG. 1 is a schematic side view of an embodiment of a gas turbine generator in a gas turbine enclosure having a ventilation system with a controllable vane, in accordance with an embodiment.

Turning to the figures, FIG. 1 is a schematic side view of an embodiment of a gas turbine system 10 in a gas turbine enclosure 12. The gas turbine system 10 includes a combustion air intake system 14, a gas turbine engine 16, and a generator 18 (e.g., electrical generator) that is powered by the gas turbine engine 16. The combustion air intake system 14 includes one or more filters 20 to filter air (e.g., combustion air) entering the gas turbine engine 16. Particles to be filtered by the combustion air intake system 14 may include ice and/or other solid particles that may be harmful to components (e.g., compressor blades, turbine blades, etc.) within the gas turbine system 10. In some embodiments, other structures may be included in the combustion air intake system 14 such as air hoods, air intake ports, and silencer baffles to name a few. The combustion air intake system 14 receives air and after processing the air (e.g., filtering), directs the air through intake port 22 and into gas turbine engine 16. After being compressed and mixed with fuel, the air, or rather, the air-fuel mixture, combusts. The energy produced in the gas turbine engine 16 is used to rotate a shaft 24 that is coupled to the generator 18. In other embodiments, the shaft 24 may be coupled to other devices or systems such a motor.

Additionally, the gas turbine system 10, being housed in the gas turbine enclosure 12, receives ventilation air from a ventilation air intake system 26 (e.g., ventilation system). The ventilation air intake system 26 includes one or more filters 28, a baffle 30, and an actuator 32 that is coupled to a vane 34 (e.g., controllable vane arm or baffle) that directs ventilation air to desired locations within the gas turbine enclosure 12. The controllable vane 34 is disposed across a port 36 (e.g., intake port) between the ventilation air intake system 26 and the gas turbine enclosure 12. A controller enables the controllable vane 34 to be automatically controlled. The controller may adjust the controllable vane 34 based on feedback received from sensors disposed within the gas turbine enclosure 12. This enables a distribution of the ventilation air to be altered as needed based on changes in conditions within the gas turbine enclosure 12. Air enters the gas turbine enclosure 12 from the ventilation air intake system 26 through the port 36. Although not shown, in some embodiments, ventilation air intake system 26 may include other elements, structures, systems, or devices such as one or more fans. Ventilation air flow may exit the gas turbine enclosure 12 via a ventilation exhaust duct 43. Gaseous emissions (e.g., exhaust gases) from the gas turbine engine 16 may exit the gas turbine enclosure 12 through a port 38, which is coupled to a combustion exhaust duct 40.

Furthermore, components of gas turbine engine 16 housed in gas turbine enclosure 12 may be subject to temperature differentials based upon a location (e.g., one dimensional, two dimensional, or three-dimensional position) in the gas turbine enclosure 12. For instance, one or more components of the gas turbine engine 16 may emit (e.g., diffuse) heat into a volume or section within the gas turbine enclosure 12 such that the volume or section has a high temperature relative to another volume or section in the gas turbine enclosure 12. Without proper cooling, this emitted heat may cause one or more components or functions of the gas turbine system 10 to have a reduction in performance or lifespan if not addressed. For example, without addressing the emitted heat, a casing of the gas turbine 16 may exceed a rated temperature limit. Likewise, ambient temperature may change throughout an operation of the gas turbine system 10 due to the gas turbine system 10 and/or, for example, sun rays that may be absorbed at a section (e.g., a wall) of the gas turbine enclosure 12. The changes in ambient temperature throughout a day (or another time period of an operation of the gas turbine system 10) may induce hot spots in the gas turbine enclosure 12 that may change locations as frequently as ambient temperature changes. Indeed, hot spots (e.g., sections, areas, or volumes in the gas turbine enclosure 12 containing high temperatures relative to other sections, areas, or volumes in the gas turbine enclosure 12) may appear in various locations inside of the gas turbine enclosure 12 throughout the operation of the gas turbine system 10. Further, during an operation of the gas turbine system 10, changes in barometric pressure may cause pressure differentials in the gas turbine enclosure 12 (e.g., pressure differences between different locations in the gas turbine enclosure 12) to be induced. Like the temperature differentials, the pressure differentials may arise in different locations at different points in time of the operation of the gas turbine engine 16, since pressure conditions can frequently change throughout the operation of the gas turbine engine 16. Without addressing the pressure differentials, one or more components of the gas turbine system 10 may have a reduction in performance, or even in lifespan. Gas turbine engines 16, gas turbine casings, and gas turbine enclosures 12 may be costly to replace. Thus systems that function to maximize the performance and/or lifespan of gas turbine modules are desirable.

Figure 2:
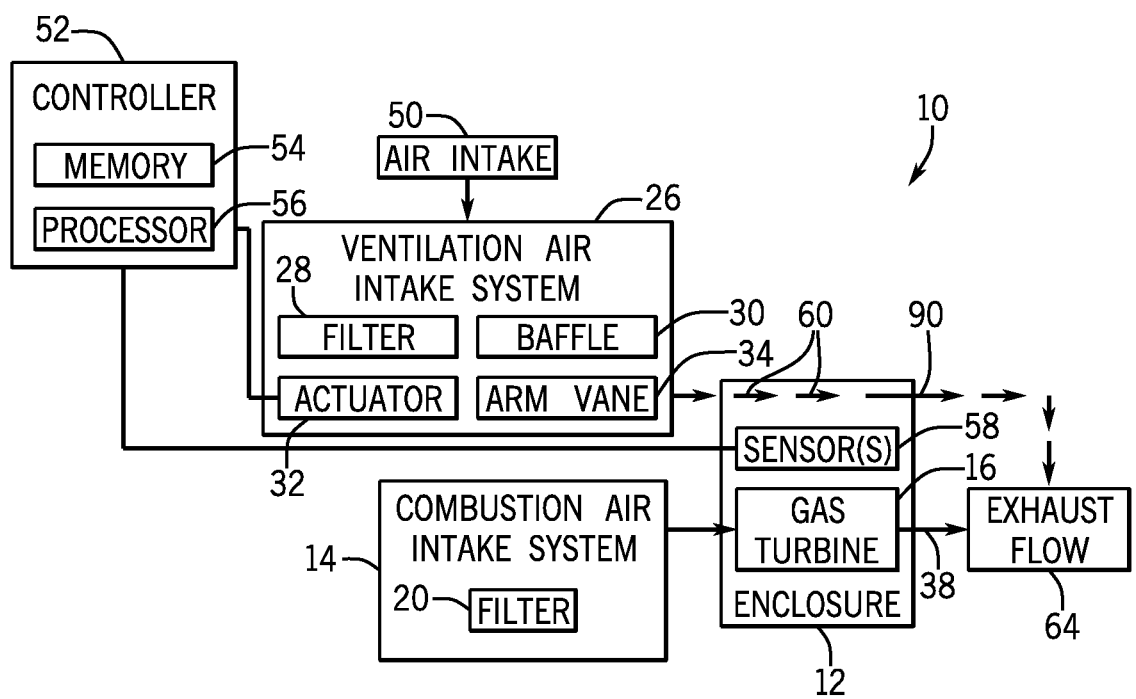
FIG. 2 is a schematic block diagram of an embodiment of the ventilation system for a gas turbine system and the gas turbine enclosure, in accordance with an embodiment.

FIG. 2 is a schematic block diagram of an embodiment of the ventilation air intake system 26 for the gas turbine system 10 and the gas turbine enclosure 12. In particular, the ventilation air intake system 26 is coupled to an air intake 50, which receives air that is to be processed (e.g., filtered). As aforementioned, the ventilation air intake system 26 includes one or more filters 28, the baffle 30, and the actuator 32 (e.g., positioner, motor, etc.) that is coupled to the controllable vane 34 which directs air flow (as indicated by arrows 60) into the gas turbine enclosure 12. A controller 52 contains computer-readable instructions stored in memory 54 (e.g., non-transitory, tangible, and computer-readable medium/memory circuitry) and a processor 56 which executes the instructions. More specifically, the memory 54 may include volatile memory, such as random access memory (RAM), and/or non-volatile memory, such as read-only memory (ROM), optical drives, hard disc drives, or solid-state drives. Additionally, the processor 56 may include one or more application specific integrated circuits (ASICs), one or more field programmable gate arrays (FPGAs), one or more general purpose processors, or any combination thereof. Furthermore, the term processor is not limited to just those integrated circuits referred to in the art as processors, but broadly refers to computers, processors, microcontrollers, microcomputers, programmable logic controllers, application specific integrated circuits, and other programmable circuits. The processor 56 and memory 54 may be used collectively to support an operating system, software applications and systems, and so forth, useful implementing the techniques described herein. For example, the memory 54 may store temperature and pressure ranges or limits of for sections of the gas turbine enclosure 12. The memory 54 may also store desired positions for the controllable vane 34 in, for example, look-up tables. The look up tables may provide a mechanism for the controller 52 to access instructions for controlling the controllable vane 34 with low latency.

Also, the controller 52 is communicatively coupled to one or more sensors 58 (e.g., temperature sensors, thermal sensors, pressure sensors, etc.) disposed through the gas turbine enclosure 12. Based upon feedback (e.g., temperature data, pressure data, etc.) from sensors 58, the controller 52 may cause the actuator 32 to change a position or orientation of the controllable vane 34. Indeed, feedback may be utilized by the controller 52 to direct the controllable vane 34 to positions that may cause in increase in cooling air distribution. For example, the controller 52 may compare feedback to threshold ranges for feedback. These threshold ranges may represent a desired operating parameter (e.g., temperature, pressure, etc.) for a location within the gas turbine enclosure 12. Upon a determination that a section of the gas turbine enclosure 12 has a hot spot and/or a pressure differential based on the feedback from the sensors 58, the controller 52 may send a command to the actuator 32 to alter a position or orientation of the controllable vane 34 to provide cooling or air flow to the section. For instance, the controllable vane 34 may be actuated to oscillate (e.g., swing back and forth) at a certain frequency between a first position or first angular orientation and a second position or second angular orientation based on feedback. Also, as will be discussed in detail later, an amplitude of an angular displacement of the controllable vane 34 between the first angular orientation and the second angular orientation may be dynamically controlled so that ventilation air is directed to specific section(s) of the gas turbine enclosure 12. Further, the controller 52 may cause the controllable vane 34 to rotate to or remain at a specific angular orientation for a specific amount of time to direct or alter an air flow from the ventilation air intake system 26 to a specific section of the gas turbine enclosure 12 enduring a hot spot and/or pressure differential. By altering an aspect (e.g., an angular orientation or position, oscillation frequency and/or amplitude) of the controllable vane 34, the ventilation air intake system 26 may provide proper air flow (e.g., via altering of distribution cool air) within the gas turbine enclosure 12 to minimize any hot spot within the gas turbine enclosure 12.

On another note, as shown in FIG. 2, combustion air intake system 14 directs combustion air through a filter 20 and into the gas turbine system 10. As mentioned in FIG. 1, the directed combustion air flow exits the gas turbine enclosure 12 through the port 38 (as indicated by an arrow 38) and goes into an exhaust flow output 64, which includes conduits such as the combustion exhaust duct 40 and the ventilation exhaust duct 43 (not shown in FIG. 2). Similarly, the ventilation air flow may exit the gas turbine enclosure 12 through a port 90 (as indicated by an arrow 90) and proceed into the ventilation exhaust duct 43.

Figure 3:
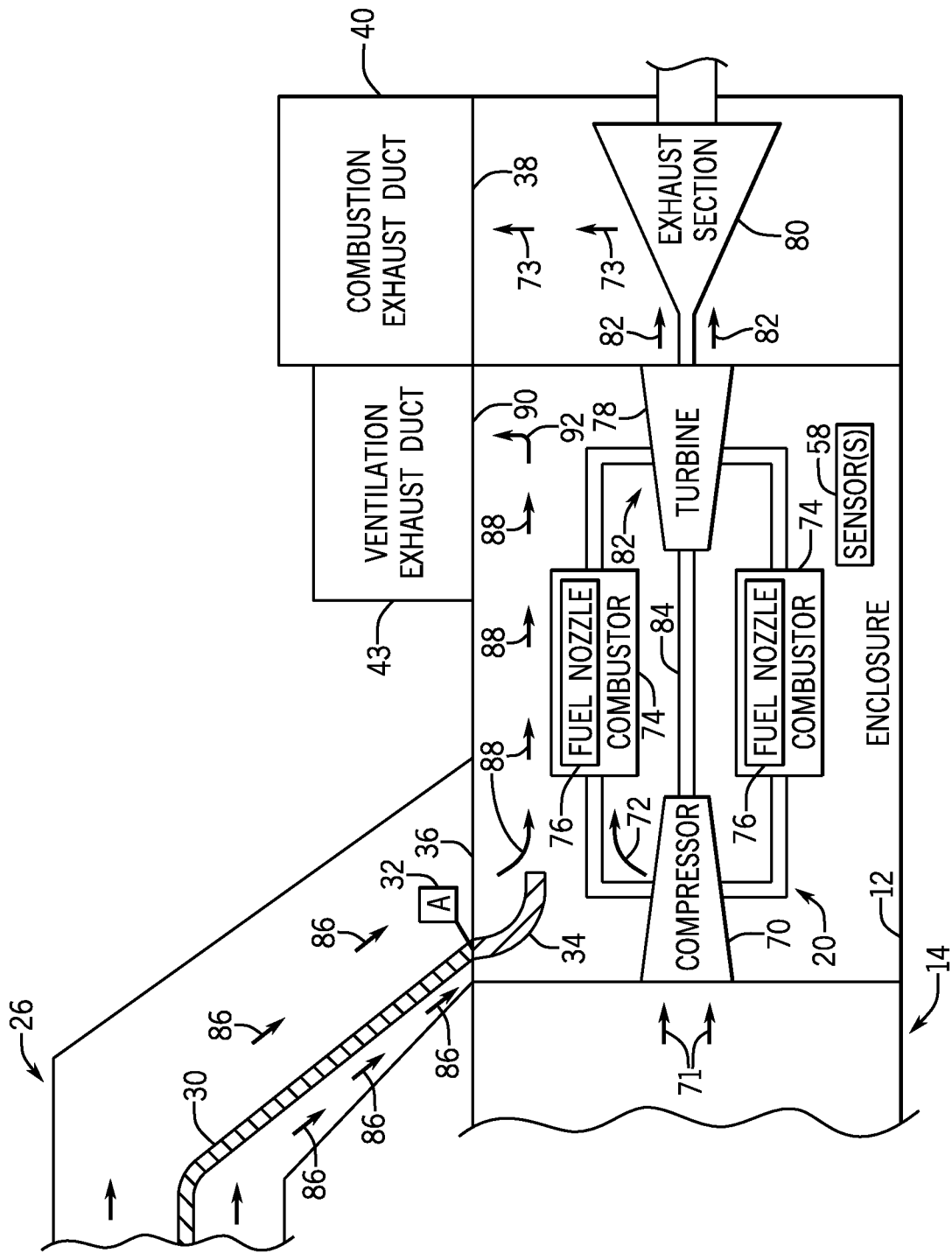
FIG. 3 is a schematic view of an embodiment of the ventilation system for the gas turbine enclosure, in accordance with an embodiment.

FIG. 3 is a schematic view of an embodiment of the ventilation air intake system 26 (e.g., ventilation system) for the gas turbine enclosure 12 and gas turbine system 10. The air intake ventilation system 26 and the gas turbine system 10, although not fully shown in FIG. 3, are as generally described in FIGS. 1 and 2. The gas turbine system 10 includes the gas turbine engine 16 disposed in the gas turbine enclosure 12. Air flows from combustion air intake system 14 into compressor 70 to be compressed at one or more compression stages (as indicated by arrows 71. Compressed air 72 is then directed into combustors 74, which are coupled to fuel nozzles 76. In some embodiments, multiple fuel nozzles may be in each combustor 74. At the combustor 74, compressed air 72 is mixed with fuel and is combusted, creating hot pressurized exhaust gases. Each combustor 74 directs the exhaust gases through a turbine 78 toward an exhaust section 80 as indicated by arrows 82. The exhaust section 80 directs the exhaust gases toward the combustion exhaust duct 40 as indicated by arrows 73. As the exhaust gases pass through the turbine 78, the gases force turbine blades in the turbine 78 to rotate a shaft 84 along an axis of the gas turbine engine 16. That is, energy from the combusted mixture cause turbine blades in the turbine 78 to rotate. The blades in the turbine 78 are coupled to the shaft 84 which is also coupled to various components of the gas turbine engine 16 including the compressor 70. Even so, as the shaft 84 rotates, compressor blades within the compressor 70 also rotate, thereby compressing air through the compressor 70. The shaft 84 may also be connected to a load, such as an electrical generator (e.g., generator 18) in an electrical power plant, for example.

In order to ventilate the gas turbine enclosure 12, air from the ventilation air intake system 26 courses through one or more filter stages (e.g., filters 28 not shown in FIG. 3) and then is directed by the baffle 30 (e.g., baffle plate, diverter plate, divider plate) towards the controllable vane 34 (as indicated by arrows 86), which then directs the air into the gas turbine enclosure 12 (as indicated by arrows 88). After ventilating the gas turbine enclosure 12, the ventilating air proceeds through the port 90 (as indicated by arrow 92). The ventilating air is then directed to enter the ventilation exhaust duct 43 (as indicated by the arrow 92) via the port 90.

In particular, the direction of the air flowing into the gas turbine enclosure 12 may be guided, at least in part, by the controllable vane 34, which is automatically controlled (e.g., rotated) by the actuator 32. Specifically, the actuator 32 (e.g., motor) is coupled to the controllable vane 34 and moves the controllable vane 34 in response to commands received from the controller 52. That is, as discussed above, one or more sensors 58 (e.g., thermal sensors, pressure sensors, etc.) are disposed throughout gas turbine enclosure 12 and contain circuitry to measure various parameters (e.g., temperature and/or pressure). The sensors 58 may be coupled to the controller 52 via a wireless or wired connection. Accordingly, the controller 52 receives feedback from the sensors 58 via the wireless or wired connection, and commands the actuator 32 to change an angular orientation or position of the controllable vane 34. Further, the sensors 58 can be attached to the walls of the gas turbine enclosure 12, directly on various components of the gas turbine system 10, and/or on the casing of the gas turbine engine 16. For example, the controller 52 may receive measurements from one or more sensors 58 that are indicative of an increased ambient temperature and/or pressure in a location or region of the gas turbine enclosure 12. In response to determining that the gas turbine enclosure 12 (or gas turbine module) is experiencing an increase in ambient temperature and/or pressure at a specific section, the angular orientation, oscillation frequency (e.g., frequency of rotation), or amplitude of oscillation of the controllable vane 34 may be modified (e.g., changed, altered, updated) in order change the distribution of air provided to improve the cooling throughout the gas turbine enclosure 12 (e.g., to minimize hot spots). Commands may also be sent to the actuator 32, via the controller 52, when measurements from sensors 58 are indicative of a decreased ambient temperature and/or pressure.

The motion of the controllable vane 34 may be a continuous motion or an incremental motion. That is, for a continuous motion, the controllable vane 34 may rotate from a first angular orientation or first position to a second angular orientation or second position without the motion of the controllable vane 34 ceasing at any angular orientation or position in between the completion of the rotation from the first angular orientation or first position to the second angular orientation or second position. The incremental motion of the controllable vane 34 may be such that the controllable vane 34 ceases motion at different preset positions or angular orientations along a path between a closed position and a fully open position.

Figure 4:
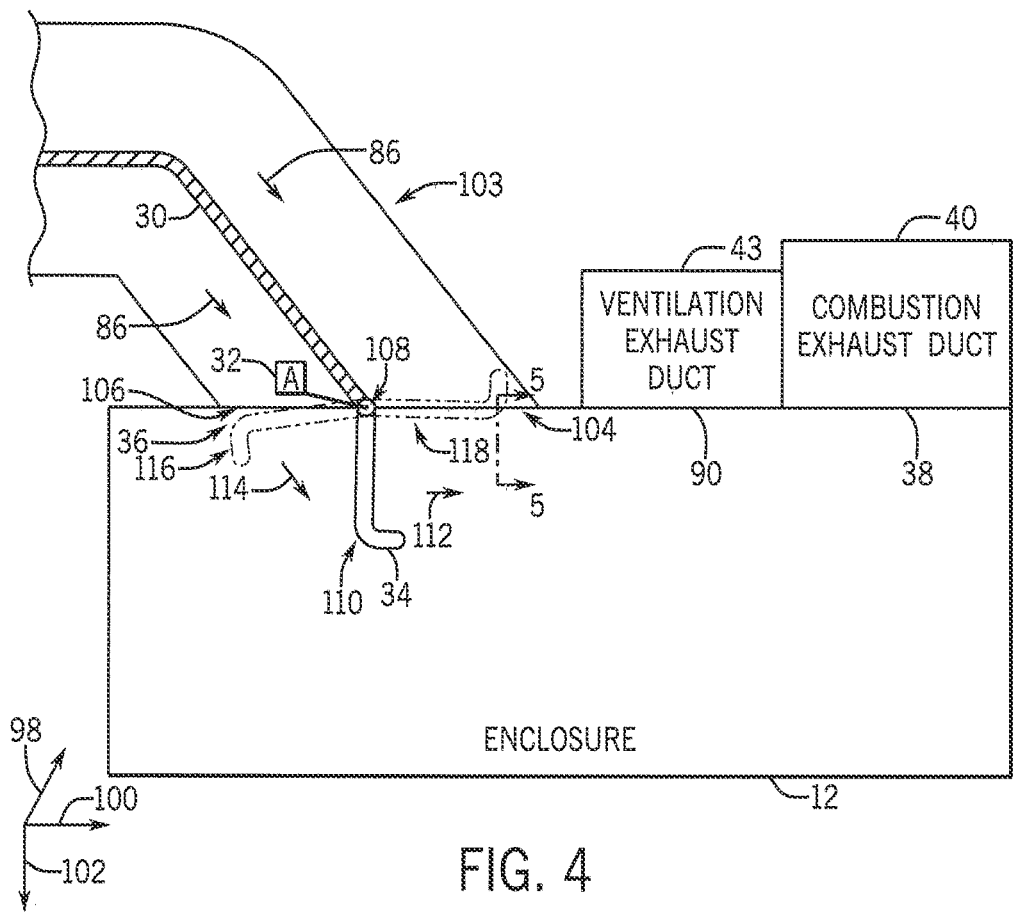
FIG. 4 is a schematic view of the controllable vane, in accordance with an embodiment.

FIG. 4 is a schematic side view of the baffle 30 (e.g., a directional air flow baffle) and the controllable vane 34. An axis 98 is along a width of the controllable vane 34, an axis 100 is along a longitudinal length of the gas turbine enclosure 12, and an axis 102 is along a height of the gas turbine enclosure 12. Specifically, the baffle 30, at least in part, directs the air that exits the ventilation air intake system 26 and enters the gas turbine enclosure 12 through a section 104 or a section 106 of the port 36. The baffle 30 is located in a conduit of the ventilation air intake system 26 and may extend across a region perpendicular or approximately perpendicular to the conduit of the ventilation air intake system 26. The baffle 30 may effectively cause the air flow that is indicated by arrows 86 to divide into two portions such that the air flow exits the conduit of the ventilation air intake system 26 through the section 104 or the section 106. In some embodiments, the baffle 30 may only extend across a portion of the conduit. Downstream of the baffle 30 is the controllable vane 34, which is disposed across the port 36 between the ventilation air intake system 26 and gas turbine enclosure 12. The controllable vane 34 rotates in a circumferential direction about an axis 108 (which is parallel to the axis 98). The controllable vane 34 rotates about the axis 108 in response to the actuator 32 changing an angular orientation of the controllable vane 34 to alter (e.g., modify, shift, redirect) the air flow from the ventilation air intake system 26 into the gas turbine enclosure 12. Indeed the actuator 32 (e.g., motor) applies torque to the controllable vane 34 such that it rotates about the axis 108. Consequently, based on the angular orientation of the controllable vane 34, air emerging out of the ventilation air intake system 26 and into the gas turbine enclosure 12 is directed to a particular location. Specifically, an angle at which an air flow enters into the gas turbine enclosure 12 is determined by the angular orientation of the controllable vane 34 relative to the axis 103. Different positions or angular orientations may direct the ventilating air flow to different locations within the gas turbine enclosure 12. For example, when the controllable vane 34 is at an angular orientation 110 about the axis 108, arrow 112 corresponds to the general direction of the air flow emerging through the section 104 and arrow 114 corresponds to the general direction of the air flow emerging through the section 106. A shift in the angular orientation of the controllable vane 34 can cause a change in the angle at which the air flow emerging through section 104 and section 106. Thus, based upon the angular orientation of the controllable vane 34, the air flow is controlled to penetrate the gas turbine enclosure 12 in different directions as indicated by arrows 112, 114.

Further, the controllable vane 34 is able to rotate between a fully open position and a closed position (relative to sections 104 and 106). The fully open position relative to section 104 corresponds to an angular orientation 116 whereby minimum air flow emerges through section 106 and maximum air flow emerges through the section 104. The closed position of the controllable vane 34 relative to the section 104 corresponds to an angular orientation 118 whereby minimum air flow emerges through section 104 and maximum air flow emerges through the section 106. Further, the fully open position of the controllable vane 34 relative to section 106 corresponds to the angular orientation 118 whereby minimum air flow emerges through the section 104 and maximum air flow emerges through the section 106. The closed position of the controllable vane 34 relative to the section 106 corresponds to the angular orientation 116 whereby minimum air flow emerges through the section 106 and maximum air flow emerges through the section 104. Thus, the closed position of the controllable vane 34 relative to the section 104 corresponds to the fully open position of the controllable vane 34 relative to the section 106. Moreover, the closed position of the controllable vane 34 relative to the section 106 corresponds to the fully open position of the controllable vane 34 relative to the section 104. In some embodiments, the controllable vane 34 is axially located along the axis 100 and extends across the entire port 36. In these embodiments, the closed position may correspond to minimum air flow through both the section 104 and the section 106, while a fully opened position corresponds to maximum air flow through both sections 104 and 106. Further, as aforementioned, the rotation of the controllable vane 34 may be continuous or incremental. The controllable vane 34 may be actuated or controlled to orient to a plurality of angular orientations to provide a proper air cooling distribution for components of the gas turbine system 10 within the gas turbine enclosure 12. Finally, in FIG. 4, the ventilation air flow exits the gas turbine enclosure 12 through the port 90 and proceeds into the ventilation exhaust duct 43.

Figure 5:
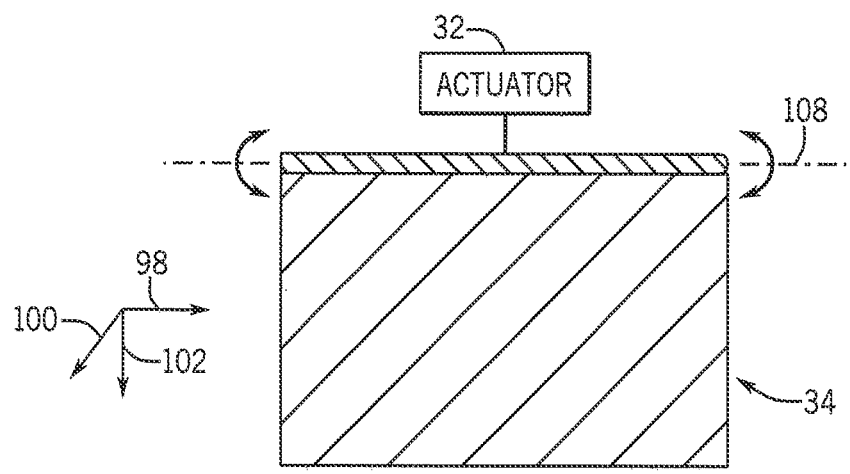
FIG. 5 is a cross-sectional view of the controllable vane taken along line 5-5 of FIG. 4.

FIG. 5 is a cross-sectional view of the controllable vane 34 taken along line 5-5 in FIG. 4. In detail, the controllable vane 34 is rotated about the axis 108, which is along a longitudinal length of the controllable vane 34, due to torque applied by the actuator 32. The controllable vane 34 may be made of a metal such as iron, a plastic, an alloy such as steel, etc., or another material that is capable of directing the air flow that emerges from the ventilation air intake system 26 into gas turbine enclosure 12.

Figure 6:
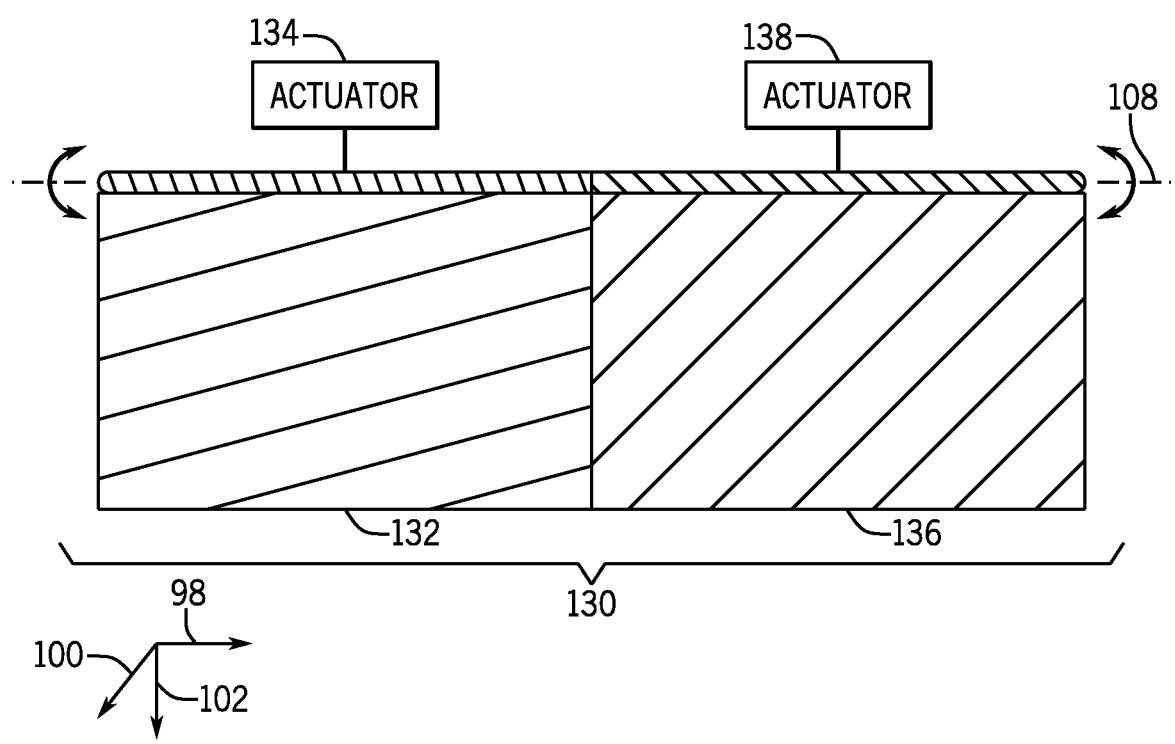
FIG. 6 is a cross sectional view of a controllable vane having multiple segments taken along line 5-5 of FIG. 4.

As shown in FIG. 6, in some embodiments, the controllable vane 34 can be segmented into two parts. Specifically, a segmented controllable vane 130 has a first vane segment 132 having a first actuator 134 and a second vane segment 136 having a second actuator 138. The first vane segment 132 and the second vane segment 136 rotate about the axis 108 and move independently relative to each other. Thus, for example, the controller 52 can send a command to the first actuator 134 to change a position or angular orientation of the first vane segment 132 without sending a command to the second actuator 138 to change a position or angular orientation of the second vane segment 136. Also, the controller 52 may send a command to both the first actuator 134 and the second actuator 138 to change a position or angular orientation of the first vane segment 132 and the second vane segment 136 respectively such that they execute the command simultaneously. As depicted, the segmented controllable vane 130 includes two segments 132, 136. In some embodiments, the number of vane segments may vary (e.g., 3, 4, or more). Further, in some embodiments, the segments may be coupled to the same actuator. In other embodiments, the ventilation air intake system 26 includes more than one rotatable vane with each vane located at a different axial location along the port 36 relative to the axis 100. In this case, the air flow from the ventilation air intake system 26 may be more precisely guided to specific directions in the gas turbine enclosure 12.

Figure 7:
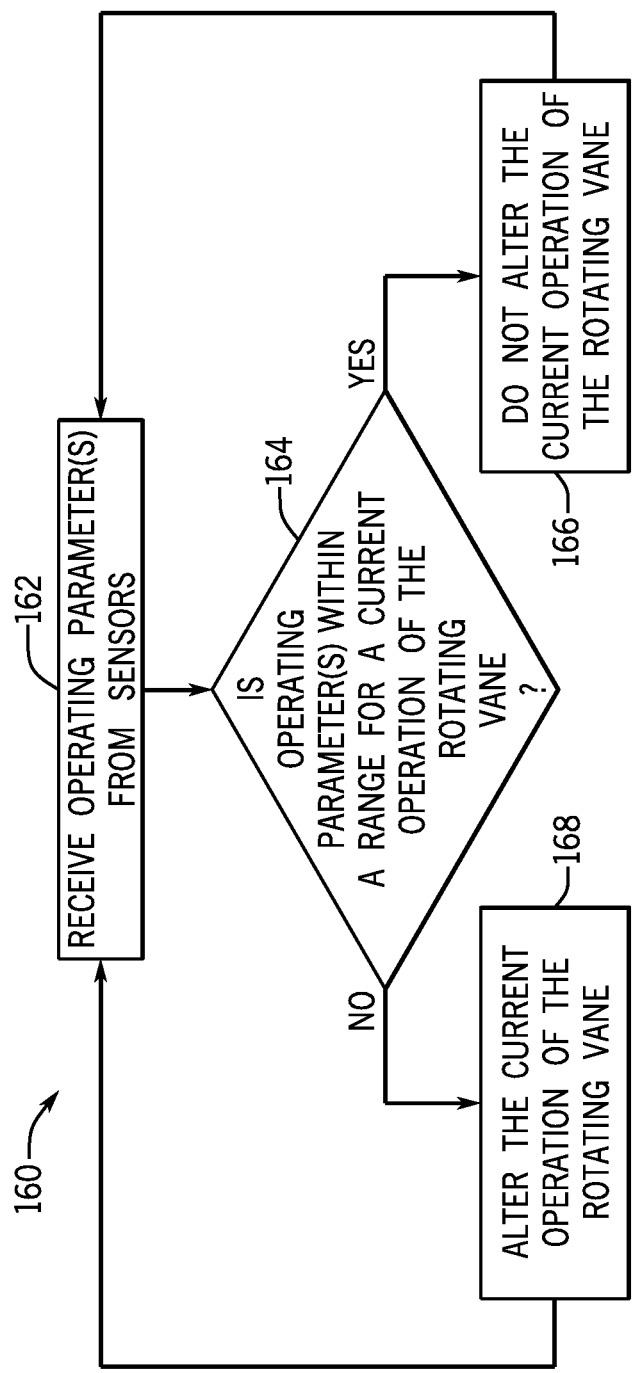
FIG. 7 is a flow chart of a method for controlling an aspect of the controllable vane, in accordance with an embodiment.

FIG. 7 is a flow chart of an embodiment of a method 160 for ventilating the gas turbine enclosure 12. In certain embodiments, one or more steps of the method 160 may be executed by the controller 52. The method 160 includes receiving one or more operating parameters from sensors 58 disposed throughout the gas turbine enclosure 12 at block 162. The sensors 58 may detect a temperature, pressure, or other parameter at one or more locations throughout the gas turbine enclosure 12. For example, as discussed above, the temperature and pressure of the gas turbine enclosure 12 may change throughout a time period of operation of the gas turbine engine 16, since ambient temperatures and pressures may fluctuate during the time period (e.g., hours, days, months, etc.). As the temperature and/or pressure changes, one or more hot spots may be detected by the sensors 58, which provide feedback (e.g., temperature and/or pressure data) to the controller 52. At block 164, the method 160 also includes determining if the received operating parameters are within a desired range for a current operation of a rotating vane (e.g., controllable vane 34). The current operation of the rotating vane can correspond to a current oscillation amplitude and/or frequency or angular orientation or position of the rotating vane. For instance, the controller 52 may determine based on the feedback if a characteristic (i.e. oscillation amplitude and/or frequency or a current angular orientation or position) of the rotating vane needs to be changed for proper cooling and air distribution within the gas turbine enclosure 12. Upon determining that the received operating parameter(s) are within a predetermined range (e.g., pressure range and/or temperature range), the method 160 proceeds with maintaining the current operation of the rotating vane at block 166. That is, an aspect of the current operation (e.g., amplitude or frequency of oscillation or an angular position or orientation) of the rotating vane is not changed. In response to determining that the received operating parameter(s) are not within a predetermined range (e.g., pressure range and/or temperature range), the method, at block 168, proceeds with changing an aspect of the current operation of the rotating vane (e.g., changing a frequency or amplitude of oscillation or an angular orientation or position). Consequently, the controller 52 may cause the rotating vane to change an angular orientation or position, and/or a frequency and amplitude of oscillation of the rotating vane. For example, in response to determining that the operating parameter(s) are not within a desired range, the controllable vane 34 may be automated to increase its frequency and amplitude of motion.

Besides providing an improvement for cooling a gas turbine enclosure 12 in varying ambient temperatures and pressures, the present embodiments of the controllable vane 34 may be particularly useful in geographical locations that endure significant changes in environmental conditions through a day, a season (e.g., summer, winter, etc.), a year, or another time period. Climate changes induce ambient temperatures and pressure boundary conditions in the gas turbine enclosure 12 that can frequently change throughout an operation of the gas turbine system 10. Specifically, as ambient temperatures and/or pressures increase or decrease, elements in the gas turbine enclosure 12 (e.g., gas turbine system 10) are subject to changes (e.g., decreases) in performance based on the changes in ambient temperature and/or pressure. Baffle vanes that are deployed to be oriented at a fixed angle are less effective in properly cooling equipment in the gas turbine enclosure 12 when ambient temperatures, pressures, and air densities change. These changes in ambient temperature, pressures, and air densities, may occur frequently and have different patterns in different climates, months, or seasons (e.g., summer months versus winter months) especially in geographical locations that have significant temperature differences between summer and winter months, whereby, for example, an average daily temperature is higher as compared with another month where the average daily temperature is lower. Consequently, deploying the controllable vane 34 (e.g., rotating air directional baffle vane) provides an effective solution to providing proper cooling and mixing of air for a range of ambient temperatures, air densities, and pressures.

In some embodiments, sensors 58 may not be present in or on the gas turbine enclosure 12. As such, the controller 52 may contain instructions that upon execution may cause the controllable vane 34 to rotate in accordance with a schedule that may be predetermined by using data of ambient pressures and temperatures over a specific amount of time before an operation of the controllable vane 34, and causing the controllable vane 34 to be actuated (e.g., rotated) in accordance with the schedule.

Technical effects of the disclosed embodiments include providing systems to ventilate gas turbine enclosures that surround gas turbine engines. The ventilation air intake system 26 includes the controller 52, which is communicatively coupled to the actuator 32 that is coupled to the controllable vane 34. The controllable vane 34 automatically rotates about the axis 108 and directs air flowing into the gas turbine enclosure 12 from the ventilation air intake system 26. Specifically, the controller 52 sends a command to the actuator 32 to change an angular orientation of the controllable vane 34 in order cause a distribution, or rather, a redistribution of air flow in the gas turbine enclosure 12. This distribution of redistribution of air flow may help cool and/or equalize a temperature distribution inside the gas turbine enclosure 12. The controllable vane 34 is particularly useful in allowing for proper ventilation for equipment in the gas turbine enclosure 12 in varying pressures and temperatures. Indeed, sensors 58 dispersed within the gas turbine enclosure 12 may provide feedback (temperature, pressure, etc.) to the controller 52. In response to a determination that a section of the gas turbine enclosure 12 contains a temperature or pressure differential, the controller 52 may cause the controllable vane 34, via the actuator 32, to rotate to certain angular positions or orientations or to change a frequency and/or amplitude of an oscillation of the controllable vane 34. The disclosed systems and methods are designed to protect the gas turbine engine 16 and increase the efficiency of the ventilation air intake system 26 in adequately ventilating the gas turbine enclosure 12 in a plurality of ambient temperatures and pressures.

This written description uses examples to disclose the subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art.

Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a gas turbine enclosure;
   a gas turbine engine disposed in the gas turbine enclosure, wherein the gas turbine engine is configured to output an exhaust flow; and
   a ventilation system coupled to the gas turbine enclosure, wherein the ventilation system comprises a conduit;
   an intake port between the gas turbine enclosure and the ventilation system, wherein the intake port is an opening located in a wall of the gas turbine enclosure and the intake port extends across a direct interface between the conduit of the ventilation system and the gas turbine enclosure;
   a vane disposed across the intake port;
   an actuator coupled to the vane; and
   a controller coupled to the actuator, wherein the controller is configured to cause the actuator to change a position of the vane to alter an air flow from the ventilation system into the gas turbine enclosure, wherein the vane extends into the gas turbine enclosure in some positions of the vane caused by the actuator.

2. The system of claim 1, wherein the controller is configured to alter the air flow from the ventilation system into the gas turbine enclosure based on feedback received from one or more sensors disposed within the gas turbine enclosure.

3. The system of claim 2, comprising the one or more sensors disposed within the gas turbine enclosure, and the one or more sensors comprise a temperature sensor, a pressure sensor, or both the temperature sensor and the pressure sensor.

4. The system of claim 1, wherein changing the position of the vane to alter the air flow from the ventilation system into the gas turbine enclosure comprises rotating the vane about an axis along a longitudinal length of the vane.

5. The system of claim 4, wherein rotation of the vane via the actuator is incremental.

6. The system of claim 4, wherein rotation of the vane via the actuator is continuous.

7. The system of claim 4, wherein the vane is configured to be rotated between a fully open position and a closed position relative to a portion of the intake port, and wherein the fully open position enables maximum air flow through the portion of the intake port and the closed position keeps the air flow from entering gas turbine enclosure via the portion of the intake port.

8. The system of claim 1, wherein changing the position of the vane to alter the air flow from the ventilation system into the gas turbine enclosure is configured to redistribute the air flow within the gas turbine enclosure to minimize any hot spot within the gas turbine enclosure.

9. The system of claim 1, wherein the actuator comprises a motor.

10. The system of claim 1, wherein the vane comprises a first vane segment and a second vane segment, and the first vane segment and the second vane segment are configured to be independently moved relative to each other.

11. The system of claim 10, wherein the actuator comprises a first actuator coupled to the first vane segment and a second actuator coupled to the second vane segment, and the first and second actuators are coupled to the controller.

12. The system of claim 1, wherein the ventilation system comprises a baffle disposed upstream of the vane.

13. A system, comprising:
    a turbine ventilation system configured to couple to a gas turbine enclosure having a gas turbine engine disposed within the gas turbine enclosure, wherein the turbine ventilation system comprises a conduit;
    an intake port between the gas turbine enclosure and the turbine ventilation system, wherein the intake port is an opening located in a wall of the gas turbine enclosure and the intake port extends across a direct interface between the conduit of the turbine ventilation system and the gas turbine enclosure;
    a vane disposed across the intake port;
    an actuator coupled to the vane;
    one or more sensors configured to be disposed within the gas turbine enclosure; and
    a controller coupled to the actuator, wherein the controller is configured to cause the actuator to change a position of the vane to alter an air flow from the turbine ventilation system into the gas turbine enclosure based on feedback received from the one or more sensors, wherein the vane extends into the gas turbine enclosure in some positions of the vane caused by the actuator.

14. The system of claim 13, wherein the one or more sensors comprise a temperature sensor, a pressure sensor, or both the temperature sensor and the pressure sensor.

15. The system of claim 13, wherein changing the position of the vane to alter the air flow from the turbine ventilation system into the gas turbine enclosure comprises rotating the vane about an axis along a longitudinal length of the vane.

16. The system of claim 15, wherein the vane is configured to be rotated between a fully open position and a closed position relative to a portion of the intake port, and wherein the fully open position enables maximum air flow through the portion of the intake port and the closed position keeps the air flow from entering gas turbine enclosure via the portion of the intake port.

17. The system of claim 13, wherein the vane comprises a first vane segment and a second vane segment, and the first vane segment and the second vane segment are configured to be independently moved relative to each other.

18. The system of claim 13, wherein the system comprises the gas turbine enclosure having the gas turbine engine.

19. A system, comprising:
    a gas turbine controller comprising a memory storing instructions and a processor coupled to the memory and configured to execute the instructions, wherein when the instructions are executed, cause the processor to:
    receive feedback from one or more sensors disposed within a gas turbine enclosure having a gas turbine engine disposed in the gas turbine enclosure; and
    cause an actuator coupled to a vane to change a position of the vane to alter an air flow from a ventilation system into the gas turbine enclosure, wherein the ventilation system comprises a conduit, and wherein the vane is disposed across an intake port between the gas turbine enclosure and the ventilation system, wherein the intake port is an opening located in a wall of the gas turbine enclosure and the intake port extends across a direct interface between a conduit of the ventilation system and the gas turbine enclosure, wherein the vane extends into the gas turbine enclosure in some positions of the vane caused by the actuator.

20. The system of claim 19, wherein changing the position of the vane to alter the air flow from the ventilation system into the gas turbine enclosure comprises rotating the vane about an axis along a longitudinal length of the vane.

\* \* \* \* \*